US009602373B2

(12) United States Patent
Li

(10) Patent No.: US 9,602,373 B2
(45) Date of Patent: Mar. 21, 2017

(54) METHOD, APPARATUS AND SYSTEM FOR DUAL-HOMING PROTECTION SWITCHING

(75) Inventor: Chunhong Li, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 650 days.

(21) Appl. No.: 13/638,266

(22) PCT Filed: Oct. 29, 2010

(86) PCT No.: PCT/CN2010/078262
§ 371 (c)(1),
(2), (4) Date: Sep. 28, 2012

(87) PCT Pub. No.: WO2011/120301
PCT Pub. Date: Oct. 6, 2011

(65) Prior Publication Data
US 2013/0021903 A1 Jan. 24, 2013

(30) Foreign Application Priority Data
Apr. 2, 2010 (CN) .......................... 2010 1 0142584

(51) Int. Cl.
H04L 12/26 (2006.01)
H04L 12/24 (2006.01)
(52) U.S. Cl.
CPC ...... H04L 43/0811 (2013.01); H04L 41/0668 (2013.01); H04L 41/0654 (2013.01)

(58) Field of Classification Search
CPC ............. H04L 43/0811; H04L 41/0668; H04L 41/0654; H04L 45/28; H04L 69/40
See application file for complete search history.

(56) References Cited

U.S. PATENT DOCUMENTS

| 2009/0161533 | A1* | 6/2009 | Ballantyne et al. .......... 370/218 |
| 2009/0201831 | A1 | 8/2009 | Kumar et al. |
| 2010/0157793 | A1* | 6/2010 | Sajassi ............... G06F 11/2007 370/228 |
| 2010/0226246 | A1* | 9/2010 | Proulx .......................... 370/228 |
| 2010/0329109 | A1* | 12/2010 | Kothari et al. ............... 370/216 |

OTHER PUBLICATIONS

International Search Report for PCT/CN2010/078262 dated Jan. 13, 2011.

* cited by examiner

Primary Examiner — Walter Divito
(74) Attorney, Agent, or Firm — Ling Wu; Stephen Yang; Ling and Yang Intellectual Property

(57) ABSTRACT

The invention discloses a method for dual-homing protection switching. The method includes: when the bidirectional forwarding detection (BFD) state of a Pseudo Wire (PW) is DOWN, the Provider Edge (PE) disenabling the Ethernet Operation, Administration and Maintenance (OAM) function of a port connected with a Customer Edge (CE); and the CE which has started a master and standby link switching function switching the service traffic to a standby link. The invention also provides corresponding apparatus and system. The invention reduces the influence of network failure on the service, decreases service unavailable probability and improves the service reliability.

12 Claims, 2 Drawing Sheets

METHOD, APPARATUS AND SYSTEM FOR DUAL-HOMING PROTECTION SWITCHING

TECHNICAL FIELD

The present invention relates to the field of communication technology, and in particular, to a method, apparatus and system for dual-homing protection switching.

BACKGROUND ART

In the current communication technology, more and more emphases are put on the reliability and fault processing ability of the communication network; that is, it needs to find the fault quickly and also to perform protection switching of the service quickly, i.e. the master state can be switched to the standby state quickly after a fault is found so as to achieve normal implementation of the service. The Internet Protocol (IP) network, especially the telecommunication-level Ethernet that is popular in recent years, puts the protection switching ability of the network in the first place. The current bearer network adopts various technologies to improve the speed of checking network fault and protection switching performance, thereby reducing the influence of network fault on services, and hence decreasing service unavailable probability and improving the service reliability. The following technologies are usually used at the Provider Edge (PE) side: Traffic Engine Fast ReRoute (TE FRR), Virtual Private Network (VPN FRR), Operation, Administration, Maintenance (OAM), Bidirectional Forwarding Detection (BFD), etc. The above technologies improve the speed of checking network fault and protection switching performance in the corresponding application scenarios. It is ensured by establishing master and standby links or master and standby Pseudo Wires or even master and standby tunnels that the traffic can be switched to the standby one quickly when the mater link, master Pseudo Wire or master tunnel has a fault, thereby guaranteeing the reliability of communication.

Access policies such as redundancy backup or load sharing are usually adopted in the CE access layer, or Rapid Spanning Tree Protocol (RSTP), VRRP or other means is used to achieve protection switching, but VRRP is a level 3 redundancy backup protocol. The VPLS technology in level 2 VPN (L2VPN) is a technology commonly used in the bearer network, and the protection switching ways usually used in VPLS are VPN FRR, TE FRR and so on, and these protection ways are all intended to protect the network of the provider.

In specific implementation process, the inventor of the present invention finds that in the VPLS environment, the AC access of the CE side cannot sense the state of VC, and when the VC state of the network operator changes, it cannot inform the AC access side in time and enable the AC access side to switch, thereby causing slowness or even interruption of service switching.

SUMMARY OF THE INVENTION

One of the purposes of the present invention is to provide a method and corresponding apparatus and system where in a VPLS environment, the AC side can sense the change of the VC state at the PE side in time, and the AC side cannot switch in time when the VC state is down.

The present invention provides a method for dual-homing protection switching, comprising the following steps of:

when a bidirectional forwarding detection (BFD) state of a Pseudo Wire (PW) is DOWN, a Provider Edge (PE) disenabling Ethernet Operation, Administration, Maintenance (OAM) function of a port connected with a Customer Edge (CE);

the CE which has started a master and standby link switching function switching traffic to a standby link.

Prior to the step of the PE disenabling Ethernet OAM function of a port connected with the CE when the BFD state of the PW is DOWN, the method further comprises:

the PE judging the BFD state of the PW;

when the BFD state of the PW is UP, the PE entering a virtual private LAN service (VPLS) processing flow.

Prior to the step of the CE which has started a master and standby link switching function switching traffic to a standby link, the method further comprises:

the CE judging an Ethernet OAM state;

when the OAM state is UP, entering a preset VPLS processing flow;

when the OAM state is DOWN, switching service traffic to a standby link having a master and standby link switching function.

The step of the CE which has started a master and standby link switching function switching traffic to a standby link comprises:

the CE which has started a master and standby link switching function, through association between the function and Ethernet OAM, switching service traffic to a standby link with a corresponding function.

A Provider Edge, comprises:

a judging module, configured to judge a bidirectional forwarding detection (BFD) state of a Pseudo Wire (PW);

a processing module, configured to: when the judging module judges that the BFD state of the PW in the Provider Edge is DOWN, disenable Ethernet OAM function of a port connected with a Customer Edge (CE).

The processing module is further configured to: when the judging module judges that the BFD state of the PW in the Provider Edge is UP, enter a preset VPLS processing flow;

when the judging module judges that the BFD state of the PW in the Provider Edge is DOWN, after disenabling the Ethernet OAM function of the port connected with the Customer Edge, enter a preset VPLS processing flow.

A Customer Edge, comprises:

a judging module, configured to judge an Ethernet OAM state;

a switching module, configured to, when the judging module judges that the OAM state is UP, enter a preset VPLS processing flow; when the judging module judges that the OAM state is DOWN, switch service traffic to a standby link having a master and standby link switching function.

The judging module is configured to judge the Ethernet OAM state according to association between the master and standby link switching function and Ethernet OAM.

A system for dual-homing protection switching, comprises:

a Provider Edge, configured to judge a bidirectional forwarding detection (BFD) state of a Pseudo Wire (PW); when the BFD state of the PW in the Provider Edge is DOWN, disenable Ethernet OAM function of a port connected with a Customer Edge (CE).

the Customer Edge, configured to judge an Ethernet OAM state; when the OAM state is UP, enter a preset VPLS processing flow; when the OAM state is DOWN, switch service traffic to a standby link having a master and standby link switching function.

In the example of the present invention, by tracking the BFD state of PW on PE, when the BFD state of the PE is down, the Ethernet OAM of the port connecting the PE to the CE is disenabled, thereby achieving association with Ethernet OAM state between the CE and the PE, and through association between Ethernet OAM and the master and standby link switching function on the CE, linkage between the PE side and the CE side is finally achieved, thereby reducing the influence of network failure on the service, decreasing service unavailable probability and improving the service reliability.

PREFERRED EMBODIMENTS OF THE INVENTION

The realization of the purpose, function characteristics and advantages of the present invention will be further described with reference to examples and drawings.

It should be understood that the specific examples described here are only used to explain the present invention, rather than to limit the present invention.

Figure 1:
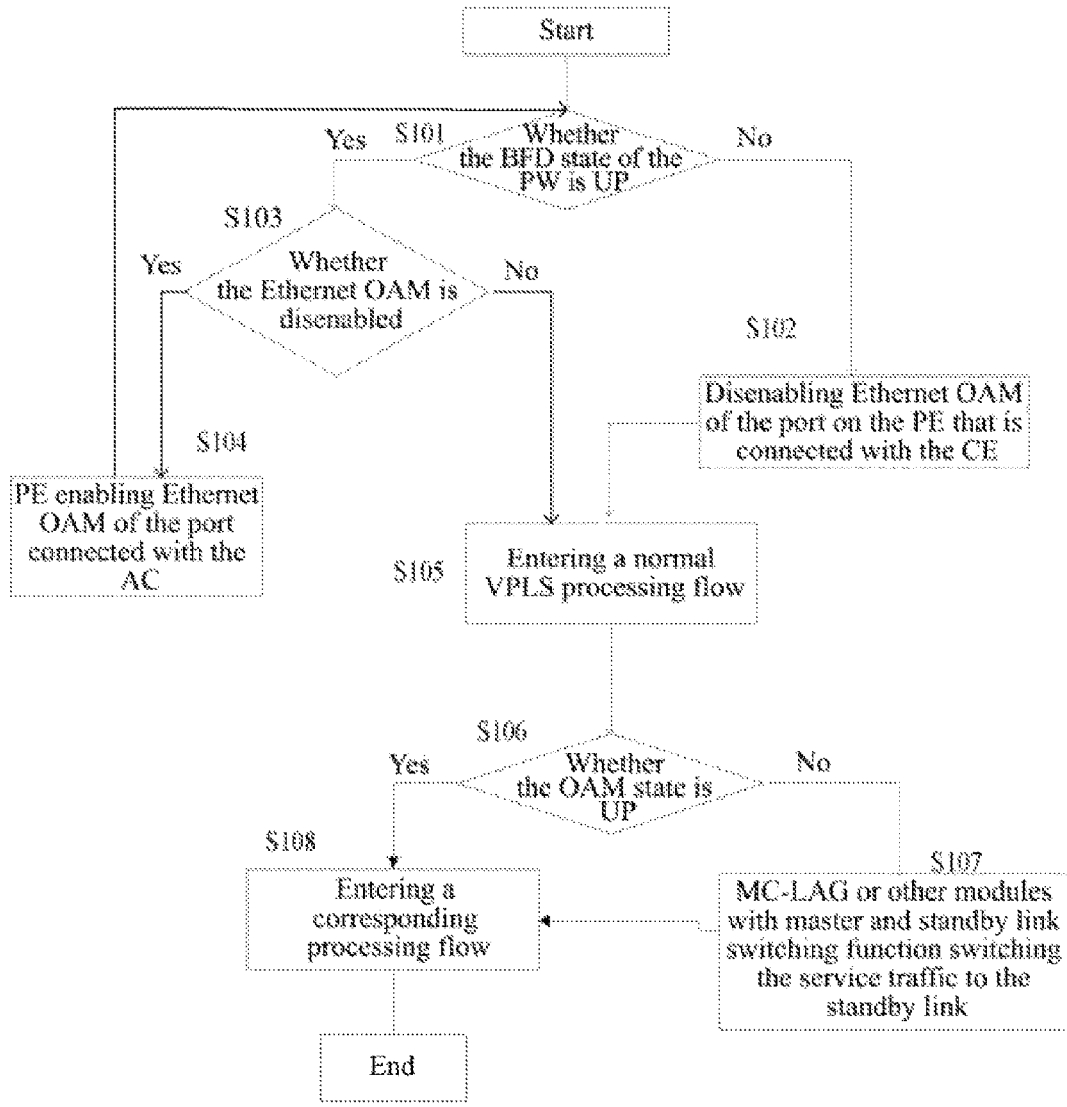
FIG. 1 is a flowchart of an example of the method for dual-homing protection switching according to the present invention.

Referring to FIG. 1, it is a flowchart of an example of the method for dual-homing protection switching according to the present invention;

In this example, in the VPLS environment, especially when the distance between a CE and a PE is long and a transmission device is provided between the PE and the CE, the Ethernet OAM function is started between the CE and PE, i.e. the OAM discovering mechanism in IEEE 802.3ah or CFM function in IEEE 802.1ag, and meanwhile a Multi-chassis Link Aggregation Group (MC-LAG) function or other modules with master and standby link switching function is started on the CE. In this example, MC-LAG is used to provide link aggregation between devices, and the aggregated links have a master-standby relationship with each other, and devices will perform master-standby link switching quickly when the master link is down. Moreover, the MC-LAG module or other modules with master and standby link switching function is associated with the Ethernet OAM function, and when the Ethernet OAM state is down, the MC-LAG module or other modules with master and standby link switching function will quickly switch the service to the standby link. The BFD function of the PW is started at the VC side on the PE, and when the BFD for PW quickly detects that the uplink PW is in DOWN state, the Ethernet OAM function at the local AC side is quickly disenabled (i.e. closing the Ethernet OAM function of the port on the PE that is connected with the AC). Through the detection mechanism of Ethernet OAM, the distal CE device can quickly detect the link problem between the CE and PE, and hence the protection measurements of the MC-LAG or other modules with master and standby link switching function are adopted to switch the local service to the standby link quickly. In this scenario, by tracking the BFD state of the Pseudo Wire (PW), the BFD state is associated with the Ethernet OAM of the local AC side. While at the CE side, the linkage between the VC side and the AC side is finally achieved through association between the MC-LAG or other modules with master and standby link switching function and Ethernet OAM.

In this example of the present invention, PE quickly senses the change of PW state by tracking the BFD state of the PW. When the state of the PW changes, PE disenables the Ethernet OAM of the port connected with the CE; at this moment, the failure occurring on the link connected with the PE can be quickly sensed by starting the Ethernet OAM function between the CE and PE on the CE, and meanwhile with the aid of association between the MC-LAG or other modules with master and standby link switching function and Ethernet OAM on the CE, the service is quickly switched to the standby link.

Step S101, the PE judges the BFD state of the PW;

when the BFD state of the PW is UP, proceed to step S103, otherwise, it continues.

Step 102, the PE disenables Ethernet OAM;

the PE disenables Ethernet OAM of the port connected with the CE, and then proceed to step S105.

Step S103, the PE judges whether the Ethernet OAM of the port connected with the CE is disenabled;

the PE judges whether the Ethernet OAM of the port connected with the CE is disenabled, and if yes, it continues, otherwise, proceed to step S105.

Step S104, the PE enables Ethernet OAM of the port connected with the CE;

the PE enables Ethernet OAM of the port connected with the CE, and then proceed to step S101.

Step S105, the VPLS processing flow is performed according to the preset rules.

The End symbol in FIG. 1 means entering processing of a corresponding module after processing of VPLS module, rather than ending of the VPLS processing flow.

The above steps are steps at the PE end, and the steps to be described below are steps at the CE end.

Step S106, the CE judges the Ethernet OAM state;

the CE judges whether the Ethernet OAM state is UP, if yes, proceed to step S108, otherwise, it continues.

Step S107, the CE switches the service traffic to the standby link;

the MC-LAG or other modules with master and standby link switching function on the CE switches the service traffic to the standby link, and then proceed to step S108.

Step S108, a normal service processing flow is performed.

In the example of the present invention, by tracking the BFD state of PW on PE, when the BFD state of the PE is down, the Ethernet OAM of the port connecting the PE to the CE is disenabled, thereby achieving association with Ethernet OAM state between the CE and the PE, and through association between Ethernet OAM and MC-LAG or other modules with the master and standby link switching function on the CE, the linkage between the PE side and the CE side is finally achieved, thereby reducing the influence of network failure on the service, decreasing service unavailable probability and improving the service reliability.

Figure 2:
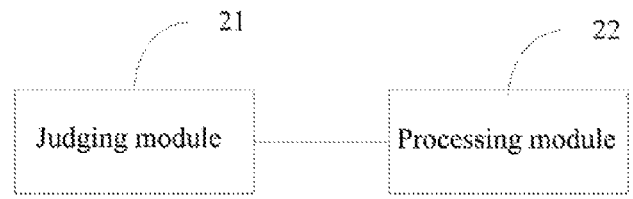
FIG. 2 illustrates the structure of an example of a PE according to the present invention.

Referring to FIG. 2, it illustrates the structure of an example of a PE according to the present invention;

the PE provided in this example comprises:

a judging module 21, configured to judge the BFD state of a PW;

a processing module 22, configured to: when the judging module judges that the BFD state of the PW in the PE is DOWN, disenable Ethernet OAM function of a port connected with a CE.

Furthermore, the processing module 22 is further configured to enter a preset VPLS processing flow when the judging module 21 judges that the BFD state of the PW in the PE is UP;

when the judging module 21 judges that the BFD state of the PW in the PE is DOWN, after disenabling the Ethernet OAM function of the port connected with the CE, enter a preset VPLS processing flow.

Figure 3:
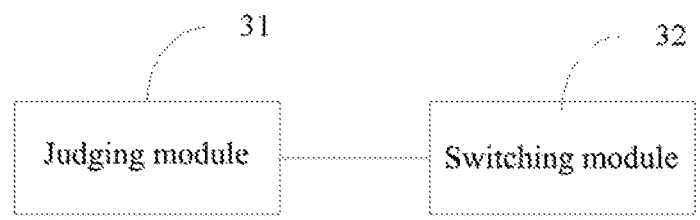
FIG. 3 illustrates the structure of an example of a CE according to the present invention.

Referring to FIG. 3, it illustrates the structure of an example of a CE according to the present invention;

A CE provided in the example of the invention, comprises:

a judging module 31, configured to judge an Ethernet OAM state;

a switching module 32, configured to: when the judging module 31 judges that the OAM state is UP, enter a preset VPLS processing flow; when the judging module judges that the OAM state is DOWN, switch service traffic to a standby link of ZESS or MC-LAG.

Furthermore, the judging module 31 is configured to judge the Ethernet OAM state according to association between the MC-LAG or other modules with the master and standby link switching function and Ethernet OAM.

Figure 4:
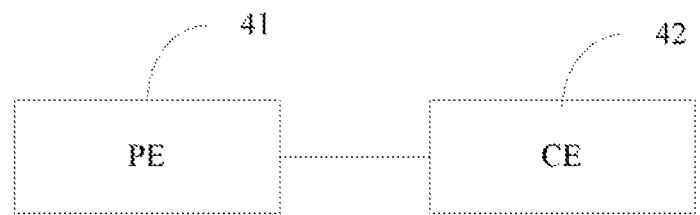
FIG. 4 illustrates the structure of an example of a system for dual-homing protection switching according to the present invention.

Referring to FIG. 4, it illustrates the structure of an example of a system for dual-homing protection switching according to the present invention.

This example of the present invention provides a system for dual-homing protection switching, comprising PE 41 and CE 42:

PE 41 is configured to judge the BFD state of a PW; when the BFD state of the PW in the PE is DOWN, disenable Ethernet OAM function of a port connected with CE 42;

CE 42 is configured to judge an Ethernet OAM state; when the OAM state is UP, enter a preset VPLS processing flow; when the OAM state is DOWN, switch service traffic to a standby link of ZESS or MC-LAG or other modules with the master and standby link switching function.

The PE 41 is the PE provided in Example two; the CE 42 is the CE provided in Example three.

In this example, the Ethernet OAM function is started between the CE 42 and PE 41, i.e. the OAM discovering mechanism in IEEE 802.3ah or CFM function in IEEE 802.1ag, and meanwhile a MC-LAG function or other modules with master and standby link switching function is started on the CE 42. In this example, MC-LAG is used to provide link aggregation between devices, and the aggregated links have a master-standby relationship with each other, and devices will perform master-standby link switching quickly when the master link is down. Moreover, the MC-LAG module or other modules with master and standby link switching function is associated with the Ethernet OAM function, and when the Ethernet OAM state is down, the MC-LAG module or other modules with master and standby link switching function will quickly switch the service to the standby link. The BFD function of the PW is started at the VC side on the PE 41, and when the BFD for PW quickly detects that the uplink PW is in DOWN state, the Ethernet OAM at the local AC side is quickly disenabled (i.e. closing the Ethernet OAM function of the port on the PE 41 that is connected with the AC). Through the detection mechanism of Ethernet OAM, the distal CE 42 can quickly detect the link problem between the CE 42 and PE 41, and hence the protection measurements of the MC-LAG or other modules with master and standby link switching function are adopted to switch the local service to the standby link quickly. In this scenario, by tracking the BFD state of the Pseudo Wire (PW), the BFD state is associated with the Ethernet OAM of the local AC side. While at the CE 42 side, the linkage between the VC side and the AC side is finally achieved through association between the MC-LAG or other modules with master and standby link switching function and Ethernet OAM.

The above examples are only preferred examples of the present invention, and are not used to limit the patent scope of the present invention. Any equivalent structure or equivalent flow transformation made according to the description and drawings of the present invention, or directly or indirectly used in other related technical fields, shall be included within the protection scope of the present invention.

INDUSTRIAL APPLICABILITY

In the present invention, by tracking the BFD state of PW on PE, when the BFD state of the PE is down, the Ethernet OAM of the port connecting the PE to the CE is disenabled, thereby achieving association with Ethernet OAM state between the CE and the PE, and through association between Ethernet OAM and the master and standby link switching function on the CE, linkage between the PE side and the CE side is finally achieved, thereby reducing the influence of network failure on the service, decreasing service unavailable probability and improving the service reliability.

What is claimed is:

1. A method for dual-homing protection switching, comprising:

a Provider Edge (PE) device, when detecting a bidirectional forwarding detection (BFD) state of a Pseudo Wire (PW) is DOWN, disenabling an Ethernet Operation, Administration, Maintenance (OAM) function of a port of the PE device which is connected with a local Customer Edge (CE) device, wherein the Ethernet OAM function is started between the PE device and the local CE device; and if the local CE device, which has a master and standby link switching function, detects that the Ethernet OAM function of the port of the PE device which is connected with the local CE device is disenable, switching service traffic from a master link connected with the PE to a standby link connected with another PE through a Multi-chassis Link Aggregation Group (MC-LAG) function to sense by an attachment circuit (AC) access of the local CE device changes of a virtual circuit (VC) state at the PE device side in time in a VPLS environment;

wherein, the BFD state of the PW of the PE device is associated with the Ethernet OAM function started between the PE device and the local CE device, and the Ethernet OAM function started between the PE device and the local CE device is associated with the MC-LAG function of the local CE device.

2. The method for dual-homing protection switching according to claim 1, wherein, before the step of the PE device disenabling the Ethernet OAM function of the port of the PE device which is connected with the local CE device, the method further comprises:

the PE device judging the BFD state of the PW;
when the BFD state of the PW is UP, the PE device entering a virtual private LAN service (VPLS) processing flow.

3. The method for dual-homing protection switching according to claim 1, further comprising:
when the local CE device detects that the Ethernet OAM function of the port of the PE device which is connected with the local CE device is UP, entering a preset Virtual Private LAN Service (VPLS) processing flow.

4. The method for dual-homing protection switching according to claim 1, wherein, the step of switching service traffic from a master link connected with the PE to a standby link connected with another PE through the MC-LAG function comprises:
the local CE device through the association between the MC-LAG function and the Ethernet OAM function of the port of the PE device, switching the service traffic from the master link to the standby link.

5. A Customer Edge (CE) device, which is located at a local side and has a master and standby link switching function and comprises a processor and a storage device, wherein the storage device stores processor-executable programs, and the programs comprise:
a judging module, configured to judge an Ethernet Operation, Administration, Maintenance (OAM) function of a port of a Provider Edge (PE) device which is connected with the local CE device; wherein, the Ethernet OAM function started between the PE device and the local CE device is associated with a bidirectional forwarding detection (BFD) state of a Pseudo Wire (PW) of the PE device, and the Ethernet OAM function started between the PE device and the local CE device is also associated with a Multi-chassis Link Aggregation Group (MC-LAG) function of the local CE device;
a switching module, configured to: when the judging module detects that the Ethernet OAM function of the port of the PE device which is connected with the local CE device is enable, enter a preset Virtual Private LAN Service (VPLS) processing flow; when the judging module detects that the Ethernet OAM function of the port of the PE device which is connected with the local CE device is disenable, switch service traffic from a master link connected with the PE to a standby link connected with another PE through the MC-LAG function to sense by an attachment circuit (AC) access of the local CE device changes of a virtual circuit (VC) state at the PE device side in time in a VPLS environment.

6. The CE device according to claim 5, wherein, the judging module is configured to judge the Ethernet OAM function of a port of the PE device according to the association between the master and standby link switching function and the Ethernet OAM function of the port of the PE device.

7. A system for dual-homing protection switching, comprising: a Provider Edge (PE) device and a local Customer Edge (CE) device, wherein:
the PE device, configured to judge a bidirectional forwarding detection (BFD) state of a Pseudo Wire (PW); when detecting the BFD state of the PW is DOWN, disenable an Ethernet Operation, Administration, Maintenance (OAM) function of a port of the PE device which is connected with the local CE device, wherein the Ethernet OAM function is started between the PE device and the local CE device;

the local CE device, which has a master and standby link switching function, configured to judge the Ethernet OAM function of the port of the PE device which is connected with the local CE device; when the local CE device detects that the Ethernet OAM function of the port of the PE device which is connected with the local CE device is enable, enter a preset Virtual Private LAN Service (VPLS) processing flow; when the local CE device detects that the Ethernet OAM function of the port of the PE device which is connected with the local CE device is disenable, switch service traffic from a master link connected with the PE to a standby link connected with another PE through a Multi-chassis Link Aggregation Group (MC-LAG) function to sense by an attachment circuit (AC) access of the local CE device changes of a virtual circuit (VC) state at the PE device side in time in a VPLS environment;
wherein, the BFD state of the PW of the PE device is associated with the Ethernet OAM function started between the PE device and the local CE device, and the Ethernet OAM function started between the PE device and the local CE device is associated with the MC-LAG function of the local CE device.

8. The system for dual-homing protection switching according to claim 7, wherein, the PE device comprises a processor and a storage device, wherein the storage device stores processor-executable programs, and the programs comprise:
a first judging module, configured to judge the BFD state of the PW; and
a processing module, configured to: when the judging module detects that the BFD state of the PW is DOWN, disenable the Ethernet OAM function of a port of the PE device which is connected with the CE device.

9. The system for dual-homing protection switching according to claim 7, wherein, the local CE device comprises a processor and a storage device, wherein the storage device stores processor-executable programs, and the programs comprise:
a second judging module, configured to judge the Ethernet OAM state of the port of the PE device which is connected with the local CE device;
a switching module, configured to: when the judging module detects that the Ethernet OAM function of the port of the PE device which is connected with the local CE device is enable, enter a preset VPLS processing flow; when the judging module detects that the Ethernet OAM function of the port of the PE device which is connected with the local CE device is disenable, switch service traffic from the master link connected with the PE to the standby link connected with another PE through the MC-LAG function.

10. The method for dual-homing protection switching according to claim 3, wherein, the step of switching service traffic from a master link connected with the PE to a standby link connected with another PE through the MC-LAG function comprises:
the local CE device through the association between the MC-LAG function and the Ethernet OAM function of the port of the PE device, switching the service traffic from the master link to the standby link.

11. The system for dual-homing protection switching according to claim 8, wherein, the processing module of the PE device is further configured to: when the judging module detects that the BFD state of the PW is UP, make the PE device enter a preset Virtual Private LAN Service (VPLS) processing flow;

when the judging module detects that the BFD state of the PW is DOWN, after disenabling the Ethernet OAM function of the port of the PE device which is connected with the local CE device, make the PE device enter the preset VPLS processing flow.

12. The system for dual-homing protection switching according to claim 9, wherein, the second judging module of the local CE device is configured to judge the Ethernet OAM function of a port of the PE device according to the association between the MC-LAG function and the Ethernet OAM function of the port of the PE device.

* * * * *